(12) United States Patent
Kawasumi (10) Patent No.: US 12,291,848 B2
(45) Date of Patent: May 6, 2025

(54) FLOW CONTROL VALVE

(71) Applicant: Hitachi Construction Machinery Co., Ltd., Tokyo (JP)

(72) Inventor: Shohei Kawasumi, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 309 days.

(21) Appl. No.: 17/437,154

(22) PCT Filed: Jun. 11, 2020

(86) PCT No.: PCT/JP2020/023019
§ 371 (c)(1),
(2) Date: Sep. 8, 2021

(87) PCT Pub. No.: WO2021/059614
PCT Pub. Date: Apr. 1, 2021

(65) Prior Publication Data
US 2022/0170241 A1 Jun. 2, 2022

(30) Foreign Application Priority Data
Sep. 25, 2019 (JP) .................................. 2019-174368

(51) Int. Cl.
*E02F 9/22* (2006.01)
*F15B 13/04* (2006.01)
(Continued)

(52) U.S. Cl.
CPC .......... *E02F 9/2225* (2013.01); *E02F 9/2267* (2013.01); *E02F 9/2282* (2013.01);
(Continued)

(58) Field of Classification Search
CPC ...... F16K 1/36; F16K 11/0708; F16K 31/383; F16K 31/1221; F16K 11/07;
(Continued)

(56) References Cited

U.S. PATENT DOCUMENTS 3,416,561 A * 12/1968 Kokaly .................. F16K 17/10
137/596.13
3,995,532 A * 12/1976 Junck ...................... F15B 13/04
91/530
(Continued)

FOREIGN PATENT DOCUMENTS

JP  2003-322105 A  11/2003
JP  2006-17273 A  1/2006
(Continued)

OTHER PUBLICATIONS

Extended European Search Report issued in European Application No. 20868896.0 dated Oct. 4, 2022 (eight (8) pages).
(Continued)

*Primary Examiner* — Craig J Price
(74) *Attorney, Agent, or Firm* — Crowell & Moring LLP (57) ABSTRACT

A main valve throttle (53) of a main valve (43) is configured by a lateral hole (53A) communicating an inlet side flow passage (25) and an outlet side flow passage (27) through the inside of the main valve (43) and a groove portion (53C) communicating the inlet side flow passage (25) and the outlet side flow passage (27) via an outer peripheral portion of the main valve (43). The groove portion (53C) is located such that a hydraulic fluid spurting from the groove portion (53C) changes the direction of a flow of a hydraulic fluid spurting from the lateral hole (53A). In this case, the direction of a flow of a hydraulic fluid F2 spurting from the lateral hole (53A) can be changed to approach the direction parallel to the center axis of the main valve (43) by a hydraulic fluid F1 spurting from the groove portion (53C).

3 Claims, 8 Drawing Sheets

(51) Int. Cl.
  *F15B 13/042*     (2006.01)
  *F15B 13/06*      (2006.01)
  *F16K 1/36*       (2006.01)
  *F16K 11/07*      (2006.01)
  *F16K 31/383*     (2006.01)

(52) U.S. Cl.
  CPC ........ E02F 9/2285 (2013.01); F15B 13/0405 (2013.01); F15B 13/0426 (2013.01); F15B 13/06 (2013.01); F16K 1/36 (2013.01); F16K 11/0708 (2013.01); F16K 31/383 (2013.01); *F15B 2211/30515* (2013.01); *F15B 2211/3116* (2013.01); *F15B 2211/329* (2013.01); *F15B 2211/40507* (2013.01); *F15B 2211/41509* (2013.01); *F15B 2211/428* (2013.01); *F15B 2211/455* (2013.01)

(58) Field of Classification Search
  CPC ........ F16K 11/0716; F16K 3/26; F16K 47/04; F16K 47/08; F16K 47/10; F15B 13/01; F15B 13/0426; F15B 13/0405; F15B 13/06; F15B 11/042; F15B 2211/428; F15B 2211/30505; F15B 2211/40507; F15B 2211/3116; F15B 2211/30515; F15B 2211/329; F15B 2211/455; F15B 2211/41509; F15B 11/16–168; F15B 13/042; F15B 13/0418; F15B 13/0417; E02F 9/2267; E02F 9/2282; E02F 9/2225; E02F 9/2285; G05D 16/185; Y10T 137/86734; Y10T 137/87185; Y10T 137/87169; Y10T 137/86549; Y10T 137/2625; Y10T 137/7754; Y10T 137/7762
  USPC ...... 91/446, 518; 137/119.01, 512.1, 625.35, 137/625.42, 625.39
  See application file for complete search history.

(56) References Cited

U.S. PATENT DOCUMENTS

| | | | | | |
|---|---|---|---|---|---|
| 4,109,561 | A | * | 8/1978 | Junck | E02F 9/2225 137/596.13 |
| 4,741,248 | A | * | 5/1988 | Budzich | F15B 13/0417 137/596.1 |
| 4,858,651 | A | * | 8/1989 | Koiwai | F15B 13/0402 137/869 |
| 5,025,625 | A | * | 6/1991 | Morikawa | F15B 11/162 91/518 |
| 5,067,389 | A | * | 11/1991 | St. Germain | E02F 9/2296 60/427 |
| 5,215,444 | A | * | 6/1993 | Bishoff | F15B 21/045 60/329 |
| 5,271,227 | A | * | 12/1993 | Akiyama | F15B 11/165 60/426 |
| 5,305,789 | A | * | 4/1994 | Rivolier | F15B 13/0417 91/518 |
| 5,315,826 | A | * | 5/1994 | Hirata | F15B 11/163 60/426 |
| 5,433,076 | A | * | 7/1995 | Sugiyama | F15B 13/0417 60/426 |
| 5,535,663 | A | * | 7/1996 | Yamashita | E02F 9/2225 91/518 |
| 5,921,165 | A | * | 7/1999 | Takahashi | F15B 13/015 91/461 |
| 6,158,462 | A | * | 12/2000 | Kashiwagi | E02F 9/2296 91/518 |
| 6,267,141 | B1 | * | 7/2001 | Rivolier | F15B 13/0417 91/518 |
| 6,745,564 | B2 | * | 6/2004 | Koo | E02F 9/2267 91/461 |
| 6,782,697 | B2 | * | 8/2004 | Mather | F15B 13/0417 91/445 |
| 6,868,672 | B2 | * | 3/2005 | Luo | F15B 13/0402 91/466 |
| 6,915,729 | B2 | * | 7/2005 | Kim | E02F 9/2271 137/596.13 |
| 7,766,041 | B2 | * | 8/2010 | Tackes | F16K 11/0716 251/117 |
| 7,913,612 | B2 | * | 3/2011 | Oosima | F15B 13/0426 91/445 |
| 8,100,145 | B2 | * | 1/2012 | Desbois-Renaudin | F15B 13/0417 91/518 |
| 8,191,579 | B2 | * | 6/2012 | Imhof | G05D 7/0133 137/625.38 |
| 8,393,348 | B2 | * | 3/2013 | Tougasaki | F15B 13/0417 137/596.13 |
| 8,844,899 | B2 | * | 9/2014 | Fujiwara | F16K 3/26 251/29 |
| 8,851,119 | B2 | * | 10/2014 | Fujiwara | F15B 13/042 137/625.68 |
| 9,027,589 | B2 | * | 5/2015 | Coolidge | F15B 13/026 137/488 |
| 9,103,355 | B2 | * | 8/2015 | Ku | F15B 13/0418 |
| 9,410,307 | B2 | * | 8/2016 | Fukuda | F15B 21/14 |
| 9,631,644 | B2 | * | 4/2017 | Huang | F16K 11/10 |
| 9,689,500 | B2 | * | 6/2017 | Coolidge | F16K 11/0708 |
| 9,719,609 | B2 | * | 8/2017 | Terao | F16K 11/0716 |
| 10,107,309 | B2 | * | 10/2018 | Mizukami | F15B 13/0417 |
| 10,563,674 | B2 | * | 2/2020 | Richer | F15B 13/026 |
| 10,947,996 | B2 | * | 3/2021 | Hrodey | F15B 20/00 |
| 2004/0226292 | A1 | * | 11/2004 | Luo | E02F 9/2207 60/468 |
| 2009/0007976 | A1 | | 1/2009 | Desbois-Renaudin | |
| 2015/0362087 | A1 | * | 12/2015 | Coolidge | F15B 11/042 137/512 |

FOREIGN PATENT DOCUMENTS

| | | |
|---|---|---|
| JP | 2009-529636 A | 8/2009 |
| JP | 2012-163156 A | 8/2012 |
| JP | 2013-257023 A | 12/2013 |

OTHER PUBLICATIONS

Korean-language Office Action issued in Korean Application No. 10-2021-7028199 dated Sep. 26, 2023 with English translation (8 pages).

International Search Report (PCT/ISA/210) issued in PCT Application No. PCT/JP2020/023019 dated Sep. 8, 2020 with English translation (five (5) pages).

Japanese-language Written Opinion (PCT/ISA/237) issued in PCT Application No. PCT/JP2020/023019 dated Sep. 8, 2020 (four (4) pages).

* cited by examiner

FLOW CONTROL VALVE

TECHNICAL FIELD

The present disclosure relates to a flow control valve, for example, provided in a hydraulic circuit of a construction machine and controlling the flow rate of hydraulic oil supplied from a hydraulic pump to an actuator.

BACKGROUND ART

Hydraulic circuits of construction machines such as a hydraulic excavator, a hydraulic crane, and a wheel loader are provided with a sheet valve type of flow control valve having a flow rate control function. This type of flow control valve variably controls the opening amount of a pilot throttle provided in a pilot valve to control the displacement amount of a main valve such that the opening amount of a feedback throttle provided in the main valve corresponds to the opening amount of the pilot throttle. As a result, the opening amount of a main valve throttle provided in the main valve can variably be controlled to control the flow rate from an inlet side flow passage to an outlet side flow passage at a desired value.

For example, the pressure of a back pressure chamber of the main valve approaches the pressure of the inlet side flow passage when the pilot valve varies as the opening amount of the pilot throttle becomes smaller. Thus, the resulting forces on the main valve in the valve closing direction due to increases in the back pressure cause the main valve to be displaced in the valve closing direction. Meanwhile, the resulting displacement of the main valve in the valve closing direction decreases the opening amount of the feedback throttle, thereby allowing the pressure of the back pressure chamber to approach the pressure of the outlet side flow passage, and decreases in the back pressure provide the main valve with forces in the valve opening direction. As a result of the position feedback action, the main valve stops at a position where "forces in the valve opening direction by the pressure of the inlet side flow passage and the outlet side flow passage" and "forces in the valve closing direction by the back pressure and the spring" are equal.

Herein, Patent Document 1 describes a spool valve including a check valve (main valve). The check valve (main valve) in Patent Document 1 is provided with a small diameter section and a taper portion at a tip end portion.

PRIOR ART DOCUMENT

Patent Document

Patent Document 1: Japanese Patent Laid-Open No. 2006-017273 A (Patent Publication No. 4463028)

SUMMARY OF THE INVENTION

Figure 8:
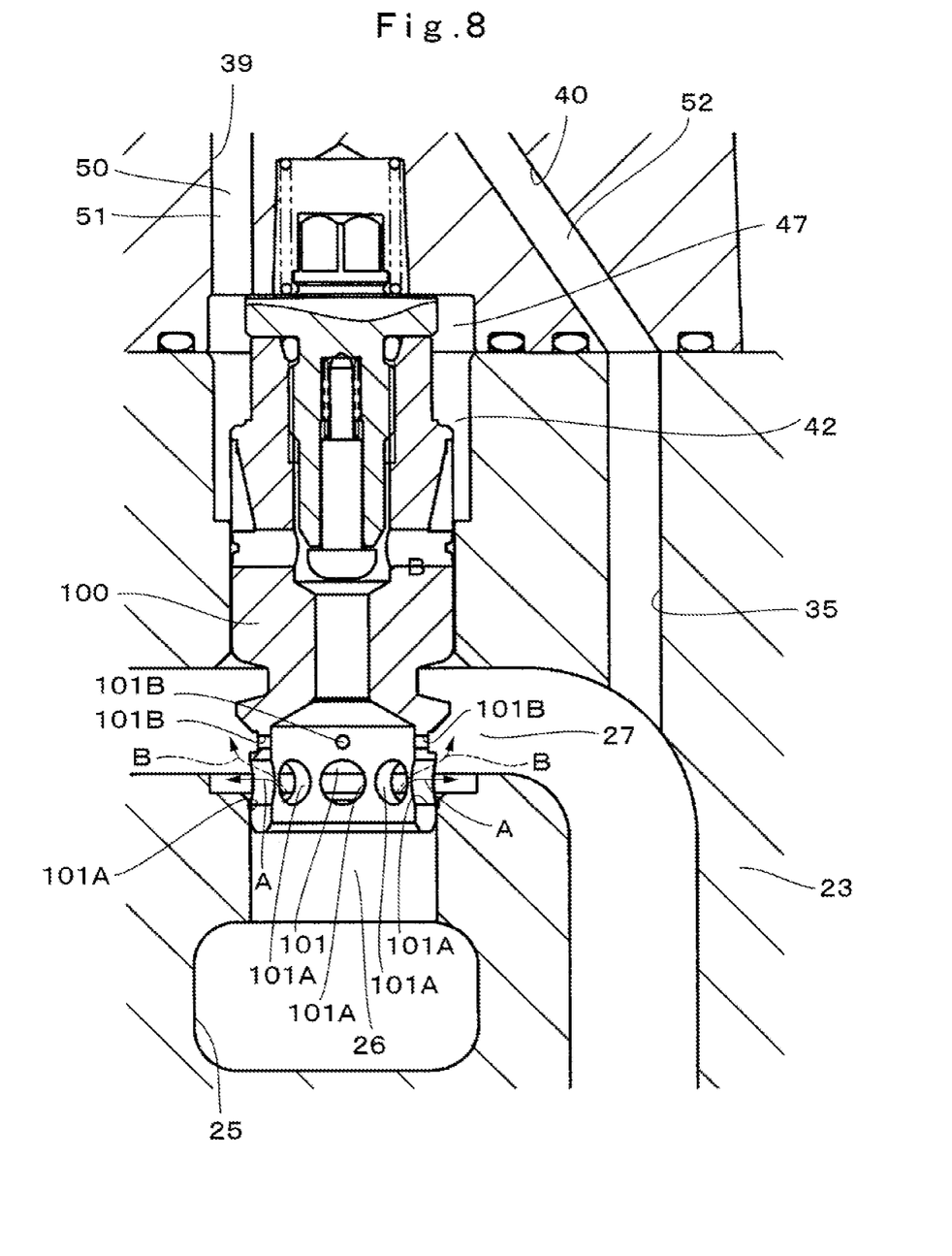
FIG. 8 is a longitudinal sectional view showing a main valve according to a Comparative Example.

FIG. 8 shows a main valve 100 of a flow control valve according to a Comparative Example. A main valve throttle 101 of the main valve 100 is configured by a lateral hole 101A and a fixed throttle 101B provided at a tip end portion of the main valve 100. In this case, fluid forces generated by the lateral hole 101A can deteriorate displacement characteristics of the main valve 100. Specifically, as shown in FIG. 8, a jet flow passes through the main valve throttle 101 in the direction perpendicular to the center axis of the main valve 100, as shown by an arrow A, when the displacement of the main valve 100 is the maximum and the opening amount of the lateral hole 101A is the maximum. Thus, fluid forces act on the main valve 100 in the valve opening direction. From the state, the displacement of the main valve 100 upon the start of its closure is slower than the case where no fluid forces in the valve opening direction occur as described above when the opening amount of the pilot throttle is made smaller such that the main valve 100 is displaced in the valve closing direction.

Also, the opening amount of the lateral hole 101A becomes smaller as the main valve 100 is displaced in the valve closing direction, and the jet flow passing through the main valve throttle 101 is converted into a flow in the direction parallel to the center axis of the main valve 100. That is, the angle of the jet flow is smaller as the main valve 100 is displaced in the valve closing direction as shown by an arrow B in FIG. 8, and the jet flow is converted into a flow in the direction parallel to the center axis of the main valve 100. As a result, fluid forces on the main valve 100 in the valve opening direction decrease and the main valve 100 tends to be further displaced in the valve closing direction. The repeated interaction rapidly displaces the main valve 100, which is likely to deteriorate the displacement characteristics. That is, the main valve 100 of the Comparative Example, as shown by a broken line (characteristics line 102) in a later-described FIG. 6, can be displaced slowly upon the start of closing, and characteristically displaced rapidly during its process.

On the other hand, the throttle of a check valve (main valve) in Patent Document 1 is configured by a small diameter section and a taper portion provided at a tip end portion. This technology is likely to control the opening amount of the main valve throttle and fluid forces by adjusting the relative relationship between the small diameter section and the taper portion. However, a phenomenon in which the direction of the jet flow passing through the main valve throttle changes as the main valve is displaced occurs as in the above-described Comparative Example. Thus, it is believed to be difficult to sufficiently reduce the impact of fluid forces. It is also believed to be hard to determine the shape of the main valve throttle that meets both conditions of the opening amount and the fluid forces because the opening amount and the fluid forces have a close relationship.

Meanwhile, a common measure for reducing fluid forces may be to decrease the relative ratio of fluid forces by increasing the pressure receiving diameter of a main valve and making higher the resulting receiving pressure on the main valve. Nevertheless, in this case, the resultant larger parts' dimensions can bring about higher manufacturing costs. In addition, it is a demanding task to apply this technology to existing conventional products.

It is an object of an embodiment of the present invention to provide a flow control valve capable of improving displacement characteristics of a main valve by reducing the impact of fluid forces, readily controlling the opening amount of a main valve throttle and fluid forces, and being manufactured in a smaller size.

An embodiment of the present invention provides a flow control valve including: a housing; a pilot housing; a main valve chamber provided in the housing; a main valve slidably provided in the main valve chamber and having a valve portion; a main valve seat provided on one end side of the main valve chamber and communicating or shutting off hydraulic fluid by allowing the valve portion of the main valve to be separated from and seated on the main valve seat; an inlet side flow passage providing pressure in the direction away from the main valve seat for the main valve and introducing hydraulic fluid from the outside of the main valve chamber to the inside of the main valve chamber; an outlet side flow passage introducing hydraulic fluid from the inside of the main valve chamber to the outside of the main valve chamber when the main valve is separated from the main valve seat and providing pressure in the direction away from the main valve seat for the main valve; a back pressure chamber provided on other end side of the main valve chamber and providing pressure in the direction coming closer to the main valve seat for the main valve; a feedback flow passage provided in the main valve and communicating the inlet side flow passage and the back pressure chamber; a pilot flow passage provided in the housing and the pilot housing and communicating the back pressure chamber and the outlet side flow passage; a main valve throttle provided in the main valve and increasing the opening amount between the inlet side flow passage and the outlet side flow passage as the main valve is displaced in the direction away from the main valve seat; a feedback throttle provided between the feedback flow passage and the back pressure chamber and increasing the opening amount between the feedback flow passage and the back pressure chamber as the main valve is displaced in the direction away from the main valve seat; a pilot valve slidably provided in the pilot housing; and a pilot throttle provided in the pilot valve and decreasing or increasing the opening amount of the pilot flow passage as the pilot valve is displaced, characterized in that in the flow control valve having a flow rate control function variably controlling the flow rate from the inlet side flow passage to the outlet side flow passage by controlling the displacement amount of the main valve, depending on the opening amount of the pilot throttle, the main valve throttle is configured by a lateral hole communicating the inlet side flow passage and the outlet side flow passage through the inside of the main valve and a groove portion communicating the inlet side flow passage and the outlet side flow passage through an outer peripheral portion of the main valve, and the groove portion is formed as a communicating passage communicating with the lateral hole in the axial direction of the main valve between the housing and an outer periphery of the main valve.

An embodiment of the present invention can improve displacement characteristics of a main valve by reducing the impact of fluid forces, readily control the opening amount of a main valve throttle and fluid forces, and can be manufactured in a smaller size.

Specifically, the main valve throttle is configured by a lateral hole and a groove portion. Then, a jet flow passing through the groove portion hits a jet flow passing through the lateral hole. At this time, the direction of hydraulic fluid spurting from the lateral hole can be changed to approach the direction parallel to the center axis of the main valve by hydraulic fluid spurting from the groove portion. Thus, the direction of a jet flow passing through the main valve throttle can approach the direction parallel to the center axis of the main valve while the lateral hole is open, regardless of the displacement of the main valve and the opening amount of the main valve throttle. As a result, fluid forces on the main valve in the valve opening direction can be reduced and slower displacement upon the start of closing can be restricted when the displacement of the main valve is the maximum and the opening amount of the lateral hole is the maximum. In addition, the degree of decreases in the fluid forces in the valve opening direction can be reduced, and rapid displacement of the main valve can be restricted when the main valve is displaced in the valve closing direction.

Further, the opening amount of the main valve throttle is regulated by a "lateral hole" and a "tubular opening formed of a housing". Meanwhile, fluid forces can be controlled by a "groove portion" and an "opening in a cross-section in the direction perpendicular to the center axis relative to the main valve formed of a housing". Thus, the opening amount of the main valve throttle and the fluid forces can independently be controlled, and the opening amount of the main valve throttle and the fluid forces can readily be controlled. In addition, it is not necessary to make larger the pressure receiving diameter of the main valve, and thus the valve can be made smaller. Moreover, this can be achieved for conventional products merely by additionally processing the same.

MODE FOR CARRYING OUT THE INVENTION

Herein after, a flow control valve according to one aspect of the present disclosure will be described in detail with reference to FIGS. 1 to 7, taking as an example of a case where the disclosure is applied to a hydraulic circuit of a hydraulic excavator.

Figure 1:
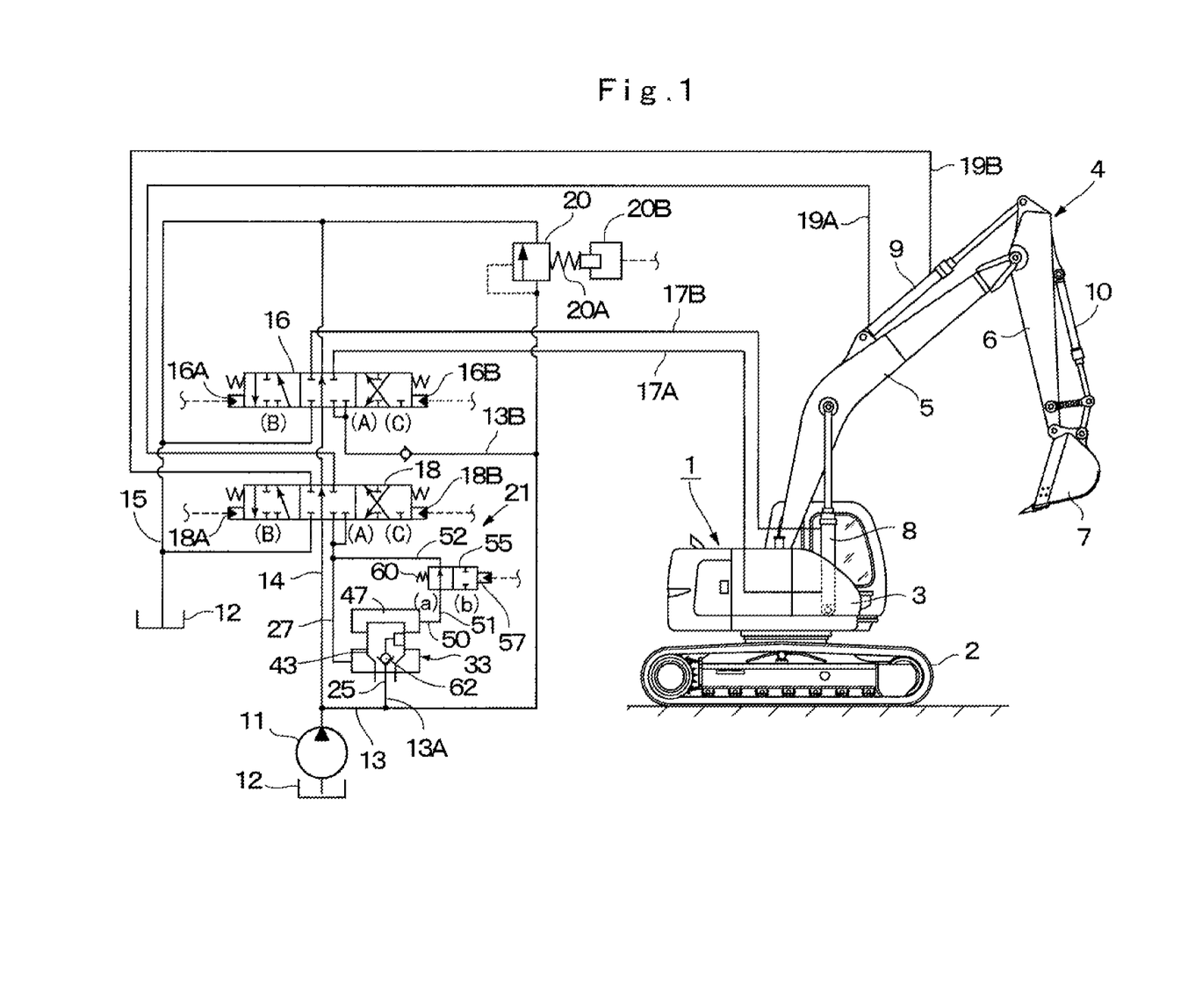
FIG. 1 is an entire constitution diagram showing a flow control valve according to an embodiment that is employed in a hydraulic circuit of a hydraulic excavator.

FIGS. 1 to 6 illustrates a flow control valve according to an embodiment of the present invention. In FIG. 1, a hydraulic excavator 1, as an exemplary construction machine, is configured to include a self-propelled crawler type lower traveling structure 2, an upper revolving structure 3 mounted rotatably on the lower traveling structure 2, and a working mechanism 4 composed of an articulated structure provided on a front side of the upper revolving structure 3 to perform excavating work. In this case, the lower traveling structure 2 and the upper revolving structure 3 constitute a vehicle body of the hydraulic excavator 1.

The working mechanism 4, called as "working device" or "front", is configured to include a boom 5, an arm 6, and a bucket 7 as a working tool. Also, the working mechanism 4 is configured to include a boom cylinder 8 as a hydraulic actuator (hydraulic actuator) driving the boom 5, an arm cylinder 9 as a hydraulic actuator driving the arm 6, and a bucket cylinder 10 (working tool cylinder) as a hydraulic actuator driving the bucket 7. The working mechanism 4 moves upward/downward by allowing cylinders 8, 9, 10 as a hydraulic cylinder to extend or contract based upon pressurized oil supplied from a hydraulic pump 11. The hydraulic circuit shown in FIG. 1 is mainly for the boom cylinder 8 and the arm cylinder 9 to avoid complexity of graphic configuration.

The main hydraulic pump 11 mounted on the upper revolving structure 3 of the hydraulic excavator 1 constitutes a hydraulic pressure source together with a tank 12. The hydraulic pump 11 is rotatively driven by a prime mover such as a diesel engine (not shown), for example. The hydraulic pump 11 discharges (supplies) pressurized oil toward a pump line 13 and a center bypass line 14 by suctioning hydraulic oil in the tank 12. The pressurized oil discharged into the pump line 13 and the center bypass line 14 is supplied to the boom cylinder 8 through a directional control valve for boom 16, and supplied to the arm cylinder 9 through a directional control valve for arm 18. Additionally, for example, a tank line 15 for recirculating return oil from the boom cylinder 8 and the arm cylinder 9 to the tank 12 side is provided between the directional control valve for boom 16, the directional control valve for arm 18 and the tank 12.

Herein, branch lines 13A, 13B are provided on the way of the pump line 13. One branch line 13A is connected to a high pressure side port (that is, a later-described outlet side flow passage 27 in FIG. 2) in the directional control valve for arm 18 through a later-described flow control valve 33. The other branch line 13B is connected to a later-described high pressure side port in the directional control valve for boom 16. In fact, the pump line 13 and the tank line 15 are connected to the bucket cylinder 10 and the like through another branch line and another directional control valve (each not shown).

The directional control valve for boom 16 (hereafter also referred to as "control valve for boom 16") as the directional control valve for the boom cylinder 8 includes left and right hydraulic pilot portions 16A, 16B, and is normally held at a neutral position (A). The control valve for boom 16 is switched from the neutral position (A) to the switching positions (B), (C) by supplying pilot pressure, for example, from a lever operating device for boom (not shown) as a hydraulic pilot type operating valve to the left and right hydraulic pilot portions 16A, 16B.

A pair of actuator lines 17A, 17B are provided between the boom cylinder 8 and the control valve for boom 16. One actuator line 17A connects a bottom side oil chamber (not shown) of the boom cylinder 8 to one pressurized oil outflow/inflow port of the control valve for boom 16. The other actuator line 17B connects a rod side oil chamber (not shown) of the boom cylinder 8 to the other pressurized oil outflow/inflow port of the control valve for boom 16.

A directional control valve for arm 18 (hereafter also referred to as "control valve for arm 18"), as a directional control valve for the arm cylinder 9, includes left and right hydraulic pilot portions 18A, 18B, and is normally held at a neutral position (A). The control valve for arm 18 is switched from the neutral position (A) to the switching positions (B), (C) by supplying pilot pressure, for example, from a lever operating device for arm (not shown) as a hydraulic pilot type operating valve to the left and right hydraulic pilot portions 18A, 18B.

A pair of actuator lines 19A, 19B are provided between the arm cylinder 9 and the control valve for arm 18. One actuator line 19A connects a bottom side oil chamber (not shown) of the arm cylinder 9 to one pressurized oil outflow/inflow port (or an outflow/inflow passage 28B shown in FIG. 2) of the control valve for arm 18. The other actuator line 19B connects a rod side oil chamber (not shown) of the arm cylinder 9 to the other pressurized oil outflow/inflow port (or an outflow/inflow passage 28A shown in FIG. 2) of the control valve for arm 18.

When the control valve for arm 18 is switched from the neutral position (A) to the switching position (B), pressurized oil from the hydraulic pump 11 is supplied to the bottom side oil chamber of the arm cylinder 9 through the branch line 13A, a later-described flow control valve 33, the control valve for arm 18, and the actuator line 19A. The pressurized oil in the rod side oil chamber is discharged into the tank 12 through the actuator line 19B, the control valve for arm 18, and the tank line 15. As a result, the arm cylinder 9 extends by the pressurized oil supplied to the bottom side oil chamber to rotate the arm 6 downward.

When the control valve for arm 18 is switched from the neutral position (A) to the switching position (C), pressurized oil from the hydraulic pump 11 is supplied to the rod side oil chamber of the arm cylinder 9 through the branch line 13A, a flow control valve 33, the control valve for arm 18, and the actuator line 19B. The pressurized oil in the bottom side oil chamber is discharged into the tank 12 through the actuator line 19A, the control valve for arm 18, and the tank line 15. As a result, the arm cylinder 9 contracts by the pressurized oil supplied to the rod side oil chamber to rotate the arm 6 upward.

A relief valve 20 is a set pressure variable type relief valve. The relief valve 20 is provided between the pump line 13, the center bypass line 14, and the tank line 15. The relief valve 20 opens, for example, when the pressure of the pump line 13 increases to the set pressure or more, and the resulting excessive pressure is relieved to the tank line 15 side. The relief valve 20 includes a pressure setting spring 20A and a pilot oil chamber 20B, and the like, and the set pressure of the pressure setting spring 20A changes according to pilot pressure supplied to the pilot oil chamber 20B from the outside. As a result, the relief valve 20 is configured to be able to control the relief set pressure at two stages between the low pressure setting and the high pressure setting or at three or more multistage.

Figure 2:
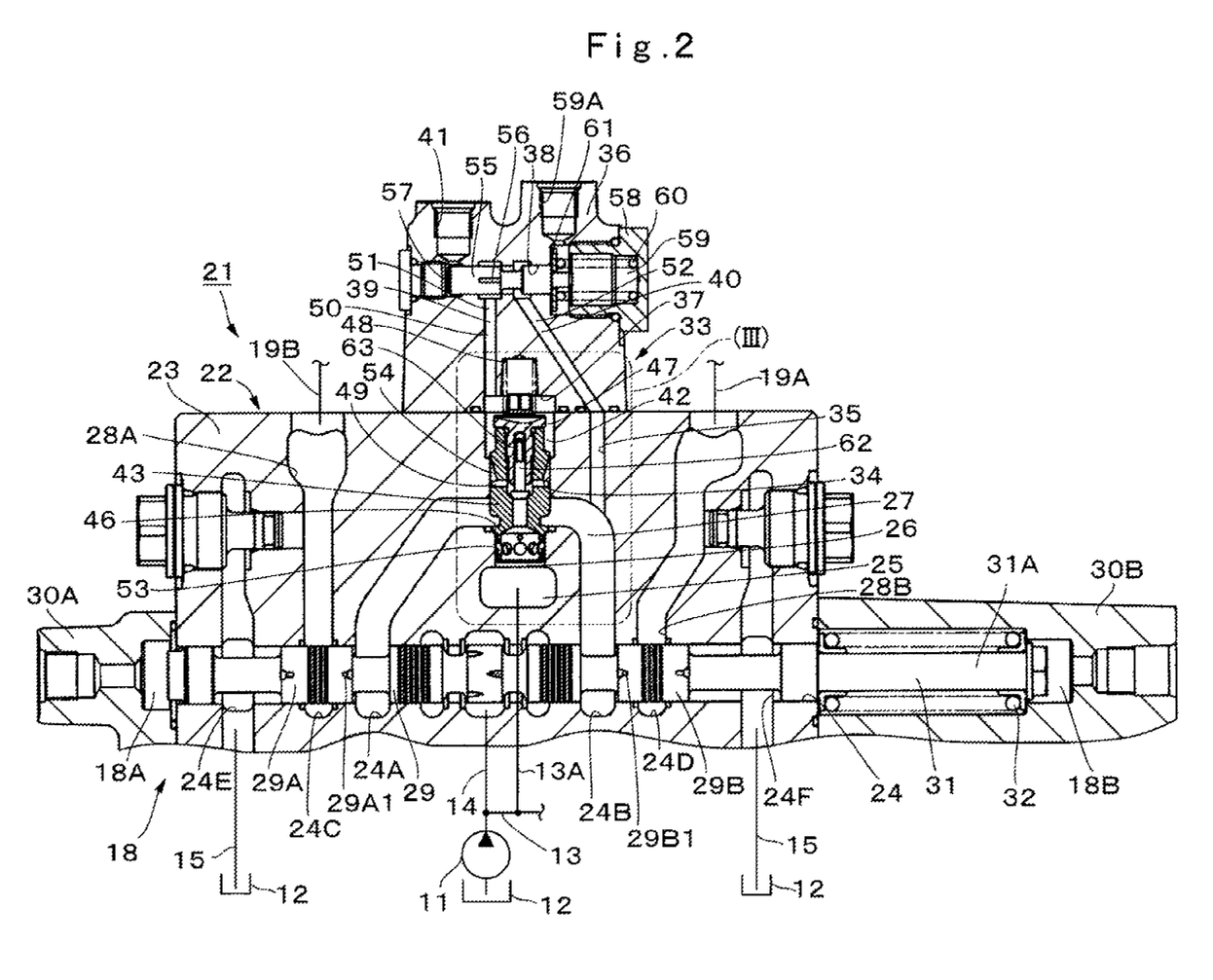
FIG. 2 is a longitudinal sectional view showing the flow control valve and a directional control valve in FIG. 1.

A control valve device 21 is configured to include the control valve for arm 18 and a later-described flow control valve 33. As shown in FIG. 2, the control valve device 21 includes a valve casing 22 that is common to the control valve for arm 18 and the flow control valve 33. In this case, the valve casing 22 is configured to include a housing 23 accommodating a spool 29 of the control valve for arm 18 and a main valve 43 of the flow control valve 33, and a pilot housing 36 accommodating the main valve 43 of the flow control valve 33 and a pilot valve 55. The housing 23 and the pilot housing 36 are separately formed as a distinct part. Mounting of the pilot housing 36 on the housing allows for configuration of the valve casing 22 as one (integrated or common) casing.

Subsequently, the control valve for arm 18 of the control valve device 21 will be described. FIG. 2 shows the control valve for arm 18 at a neutral position (A).

The control valve for arm 18 is a spool valve device controlling the direction of pressurized oil supplied from the hydraulic pump 11 to the arm cylinder 9. The control valve for arm 18 is configured to include the housing 23, a spool sliding bore 24, an inlet side flow passage 25, an outlet side flow passage 27, a pair of outflow/inflow passages 28A, 28B, the spool 29, left and right lid members 30A, 30B, a stopper 31, and a spring 32. The housing 23 constitutes the valve casing 22 of the control valve device 21 together with the pilot housing 36. The spool sliding bore 24, the inlet side flow passage 25, the outlet side flow passage 27, and the pair of outflow/inflow passages 28A, 28B are formed in the housing 23.

The spool sliding bore 24 linearly extends by penetrating in the right-and-left direction of the housing 23 (in the right-and-left direction in FIG. 2, or in the axial direction where a later-described spool 29 slides). First annular oil grooves 24A, 24B, second annular oil grooves 24C, 24D, and third annular oil grooves 24E, 24F are formed on the peripheral wall side of spool sliding bore 24. The first annular oil grooves 24A, 24B are provided to be separated to each other in the right-and-left direction on the central side in the axial direction of the spool sliding bore 24. The second annular oil grooves 24C, 24D are provided to be separated to each other in the right-and-left direction at a position more outside of the axial direction of the spool sliding bore 24 than the first annular oil grooves 24A, 24B. The third annular oil grooves 24E, 24F are provided to be separated to each other in the right-and-left direction at a position more outside of the axial direction of the spool sliding bore 24 than the second annular oil grooves 24C, 24D.

The first annular oil grooves 24A, 24B communicate with each other by the outlet side flow passage 27 formed overall in an inverted U-shaped. The first annular oil grooves 24A, 24B are communicated or shut off relative to the second annular oil grooves 24C, 24D when the spool 29 is displaced in the right-and-left direction from a neutral position shown in FIG. 2. The second annular oil grooves 24C, 24D normally communicate with the pair of actuator lines 19A, 19B via the left and right outflow/inflow passages 28A, 28B. The third annular oil grooves 24E, 24F normally communicate with the tank 12 via each tank line 15. The third annular oil grooves 24E, 24F are communicated or shut off relative to the second annular oil grooves 24C, 24D when the spool 29 is displaced in the right-and-left direction from the neutral position shown in FIG. 2.

The inlet side flow passage 25 is provided at a position separated in the radial direction from the spool sliding bore 24. In this case, the inlet side flow passage 25 extends along the direction perpendicular to the spool sliding bore 24 (in a front-and-rear direction in FIG. 2). The inlet side flow passage 25 is connected to the hydraulic pump 11 through the pump line 13 (more specifically, the branch line 13A). The outlet side flow passage 27 crosses the inlet side flow passage 25 at a position of the communicating hole 26, and extends overall in an inverted U-shaped. The outlet side flow passage 27 communicates the first annular oil grooves 24A, 24B separated each other and provided.

The communicating hole 26 is disposed at a position opposite a later-described valve sliding bore 34 by interposing the outlet side flow passage 27. The communicating hole 26 is communicated such that the inlet side flow passage 25 is across the outlet side flow passage 27. The communicating hole 26 constitutes the main valve chamber 42 together with a later-described valve sliding bore 34 and a recessed portion 37 of the pilot housing 36. A tapered main valve seat 46, as an annular valve seat from and on which a later-described main valve 43 is separated and seated, respectively, is provided at an intersecting portion between the outlet side flow passage 27 and the communicating hole 26.

A pair of outflow/inflow passages 28A, 28B are provided to be separated in the right-and-left direction of the housing 23 so as to interpose the outlet side flow passage 27 and the valve sliding bore 34. The pair of outflow/inflow passages 28A, 28B constitute pressurized oil outflow/inflow ports of the control valve for arm 18. That is, the pair of outflow/inflow passages 28A, 28B are connected to (a rod side oil chamber, a bottom side oil chamber of) the arm cylinder 9 through the actuator lines 19A, 19B.

The spool 29 is inserted to the spool sliding bore 24 of the housing 23. The spool 29 is slidingly displaced in the right-and-left direction in the spool sliding bore 24 according to pilot pressure supplied to the hydraulic pilot portions 18A, 18B from the outside. As a result, the control valve for arm 18 shown in FIG. 1 is switched from the neutral position (A) to left and right switching positions (B), (C).

As shown in FIG. 2, the spool 29 includes switching lands 29A, 29B allowing the second annular oil grooves 24C, 24D to selectively communicate with or shut off either one of the first annular oil grooves 24A, 24B and the third annular oil grooves 24E, 24F. A plurality of notches 29A1, 29B1 finely controlling the flow rate of pressurized oil is formed circumferentially to be separated each other on the switching lands 29A, 29B.

Herein, the switching land 29A of the spool 29 communicates the first annular oil groove 24A with the second annular oil groove 24C when the spool 29 is slidingly displaced in the left direction in FIG. 2. In addition to that, the switching land 29B of the spool 29 shuts off the first annular oil groove 24B to the second annular oil groove 24D, and communicates the second annular oil groove 24D with the third annular oil groove 24F. As a result, the control valve for arm 18 is switched from the neutral position (A) shown in FIG. 1 to the right switching position (C).

Meanwhile, the switching land 29B of the spool 29 communicates the first annular oil groove 24B with the second annular oil groove 24D when the spool 29 is slidingly displaced in the right direction in FIG. 2. In addition to that, the switching land 29A of the spool 29 shuts off the first annular oil groove 24A to the second annular oil groove 24C, and communicates the second annular oil groove 24C with the third annular oil groove 24E. As a result, the control valve for arm 18 is switched from the neutral position (A) shown in FIG. 1 to the left switching position (B).

Left and right lid members 30A, 30B constitute the control valve for arm 18 together with the spool 29. The lid members 30A, 30B are mounted on the housing 23 located on both sides in the axial direction (in the right-and-left direction) of the spool sliding bore 24. The lid members 30A, 30B close both end sides of the spool sliding bore 24. The right side lid member 30B is formed longer than the left side lid member 30A, and a spring 32 for centering is provided in the right side lid member 30B. The hydraulic pilot portions 18A, 18B are provided inside the lid members 30A, 30B. Pilot pressure is supplied to the hydraulic pilot portions 18A, 18B from an operating valve (lever operating device). The spool 29 of the control valve for arm 18 is slidingly displaced in the right-and-left direction in FIG. 2 in the spool sliding bore 24 according to the pilot pressure.

The stopper 31 is provided integrally with the spool 29 on the right side of the spool 29. The stopper 31 is displaceably disposed in the lid member 30B, and includes a shaft portion 31A extending in the axial direction in the lid member 30B. The stopper 31 restricts the stroke end of the spool 29 when the spool 29 is displaced in the right direction in FIG. 2.

The spring 32 is a spring for centering holding the spool 29 at a neutral position. The spring 32 is disposed in the state where it is located on an outer peripheral side of a shaft portion 31A of the stopper 31 and initial load is provided between an end surface of the spool 29 and the stopper 31 beforehand. The spring 32 holds the spool 29 at the neutral position when pilot pressure from the hydraulic pilot portions 18A, 18B declines to the tank pressure level.

Figure 3:
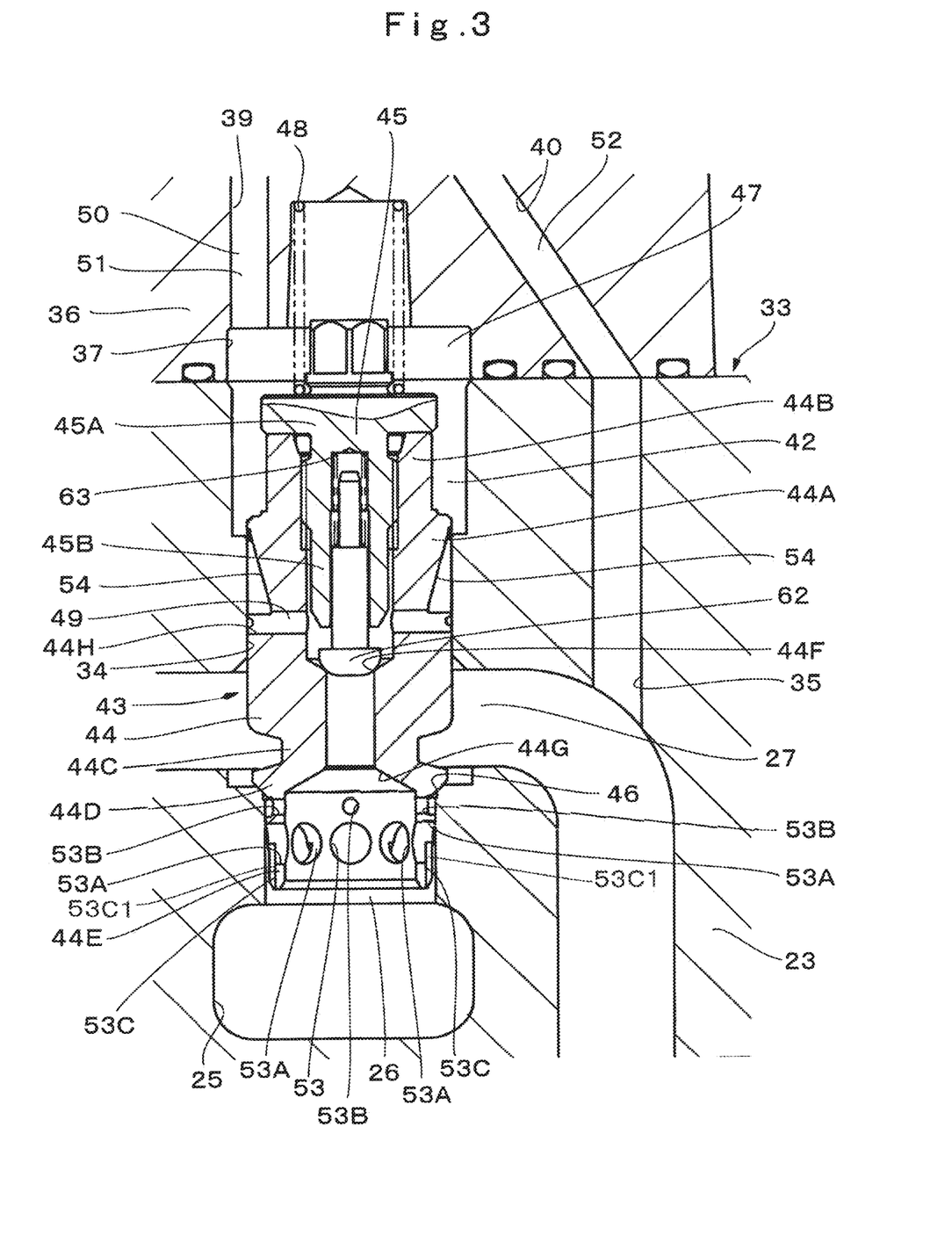
FIG. 3 is a longitudinal sectional view showing an enlarged (III) portion in FIG. 2.
Figure 4:
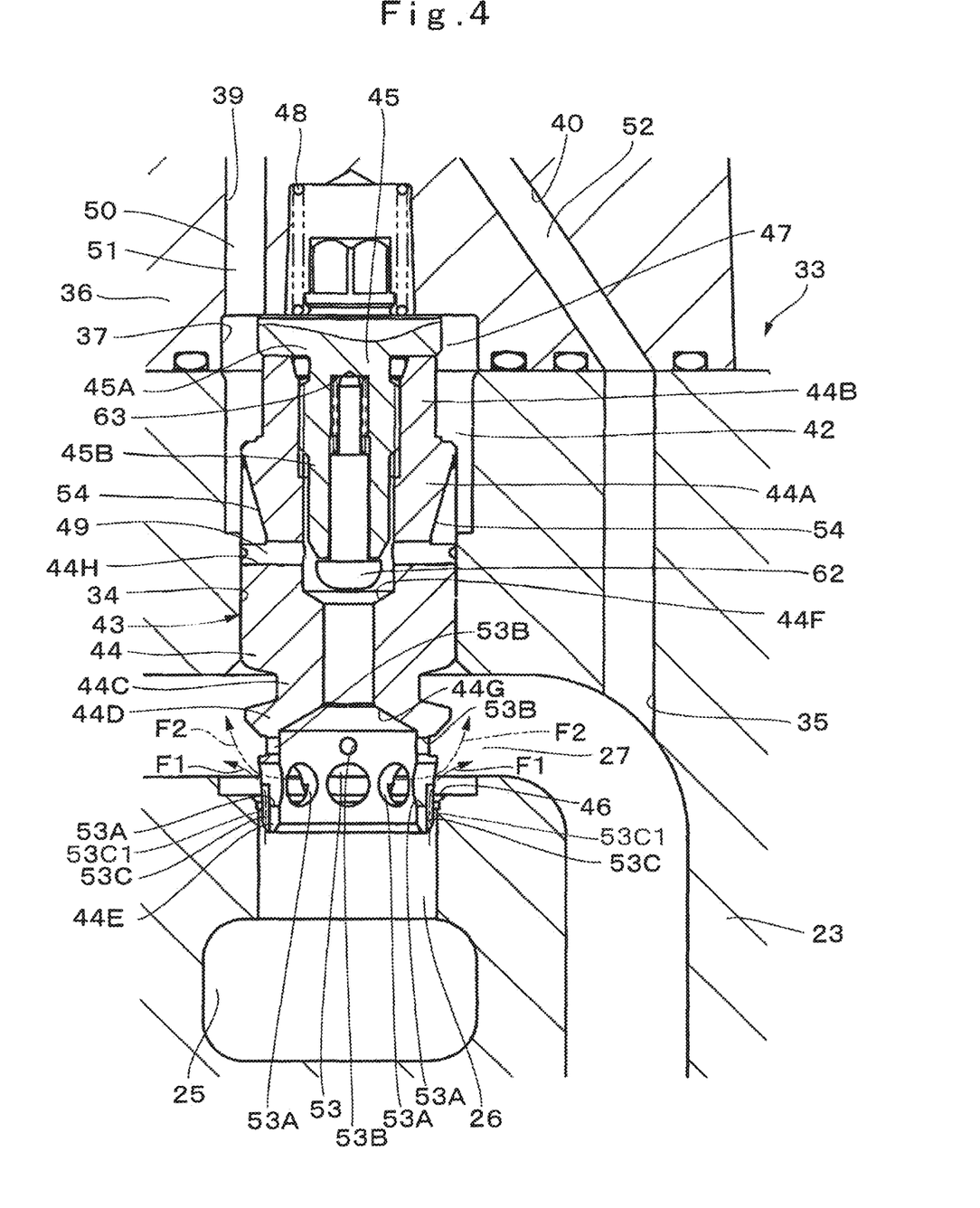
FIG. 4 is a longitudinal sectional view showing a main valve that is open at the same position as in FIG. 3.
Figure 5:
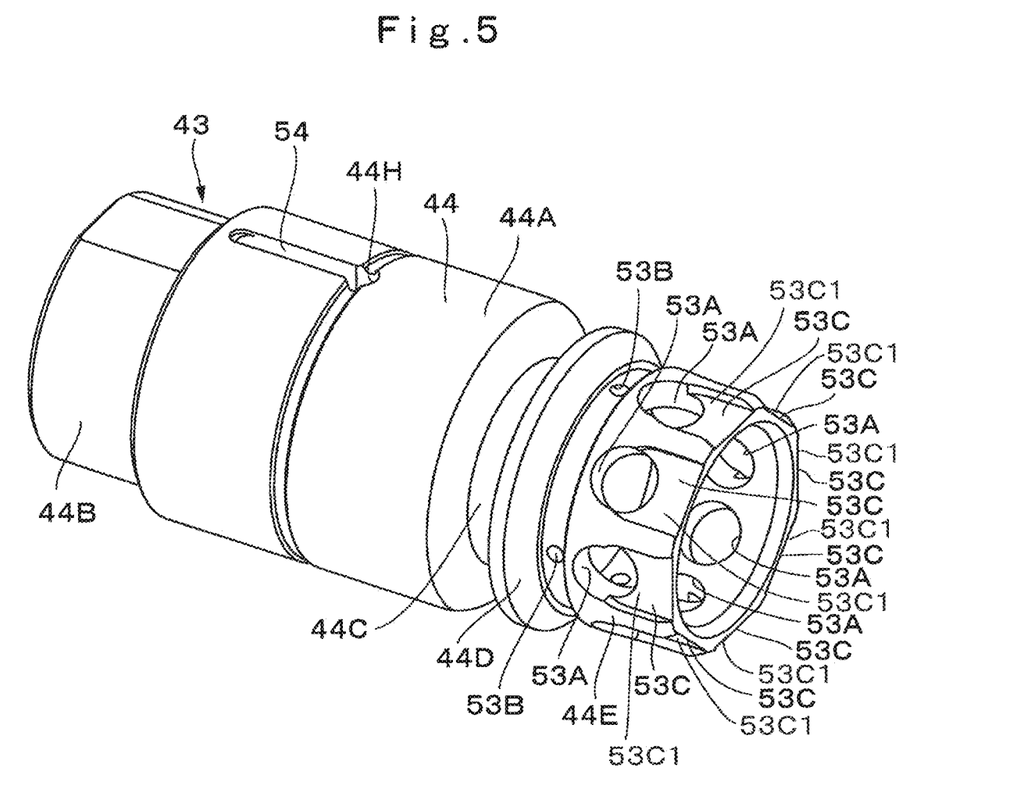
FIG. 5 is a perspective view showing the main valve.

Subsequently, the flow control valve 33 of the control valve device 21 will be described. FIGS. 2 and 3 show that the main valve 43 is open, and FIG. 4 shows that the main valve 43 is most open with the maximum flow rate.

The flow control valve 33 is a poppet valve device controlling the flow rate of pressurized oil supplied to the arm cylinder 9. The flow control valve 33 includes the housing 23, the pilot housing 36, the main valve chamber 42, the main valve 43, the main valve seat 46, the inlet side flow passage 25, the outlet side flow passage 27, a back pressure chamber 47, a feedback flow passage 49, a pilot flow passage 50, a main valve throttle 53, a feedback throttle 54, the pilot valve 55, and a pilot throttle 56.

The housing 23 constitutes a casing of the flow control valve 33 together with the pilot housing 36. The valve sliding bore 34 and a branch passage 35 are formed on the housing 23, in addition to the inlet side flow passage 25, the communicating hole 26, and the outlet side flow passage 27.

The valve sliding bore 34 is disposed to be opposite the inlet side flow passage 25 by interposing the communicating hole 26 and the outlet side flow passage 27, and formed as a stepped hole. The valve sliding bore 34 extends along the direction perpendicular to spool sliding bore 24 (in the vertical direction in FIG. 2) between the pilot housing 36 and the outlet side flow passage 27. The valve sliding bore 34 constitutes the main valve chamber 42 together with the communicating hole 26 and the recessed portion 37 of the pilot housing 36. The main valve 43 is displaceably inserted (fitted) within the main valve chamber 42.

The branch passage 35 is an oil passage branched off on the way of the outlet side flow passage 27. The branch passage 35 normally communicates with the second passage 40 on the pilot housing 36 side. The branch passage 35 constitutes the pilot flow passage 50 together with the second passage 40 and the first passage 39 as another passage provided in the pilot housing 36.

The pilot housing 36 constitutes a casing (valve casing 22) of the flow control valve 33 together with the housing 23. The pilot housing 36 is provided on an outer side surface of the housing 23 so as to close the valve sliding bore 34 of the housing 23 from the outside. The recessed portion 37 accommodating a later-described main valve 43 and a valve spring 48, a valve accommodating bore 38 accommodating a later-described pilot valve 55 and the like, the first passage 39 communicating the valve accommodating bore 38 and the recessed portion 37, the second passage 40 extending to be diagonally inclined between the branch passage 35 of the housing 23 and the valve accommodating bore 38 and communicating with or shutting off the first passage 39 by the pilot valve 55, and a supply/discharge port 41 of pilot pressure are provided in the pilot housing 36. The supply/discharge port 41 is connected to the pilot chamber 57 defined by an inner surface of the valve accommodating bore 38 and the pilot valve 55.

The main valve chamber 42 is provided in the housing 23 and the pilot housing 36. The main valve chamber 42 is configured by the valve sliding bore 34 and the communicating hole 26 of the housing 23 and the recessed portion 37 of the pilot housing 36 to accommodate the main valve 43 therein. As a result, the main valve chamber 42 is provided both in the housing 23 and the pilot housing 36.

The main valve 43 is slidably provided in the main valve chamber 42. The main valve 43 is a valve body of the flow control valve 33, and includes a valve portion 44D. In this case, the main valve 43 is configured to include a stepped valve member 44 inserted within the valve sliding bore 34, and a valve-holding member 45 provided threadedly engaged with one side in the axial direction of the valve member 44 and displaceably holding a later-described check valve 62 with the valve member 44. The valve-holding member is configured to include a spring receiving portion 45A supporting the valve spring 48 with (a bottom portion of) the recessed portion 37 of the pilot housing 36 in a contracting state, and a holding cylinder portion 45B displaceably holding a check valve 62 therein formed in a bottomed cylinder and screwed into the valve member 44 (on an upper portion side of a later-described stepped hole portion 44G). The check valve 62 and the spring 63 are accommodated inside the holding cylinder portion 45B.

The valve member 44 is configured to include a large-diameter portion 44A slidably inserted within the valve sliding bore 34, a small diameter cylinder portion 44B provided on one side in the axial direction of the large-diameter portion 44A, the valve portion 44D integrally formed through a smaller reduced diameter portion 44C on the other side in the axial direction of the large-diameter portion 44A and whose outer peripheral side is separated from and seated on the main valve seat 46 of the housing 23, and a cylindrical projecting portion 44E projecting in the axial direction toward the inlet side flow passage 25 from the other side of the valve portion 44D (on a tip end side). In this case, the valve portion 44D is also called as "sheet portion" and provided in the main valve 43 (valve member 44). The valve portion 44D contacts with (is seated on) the main valve seat 46 to block the flow of the hydraulic fluid between the inlet side flow passage 25 and the outlet side flow passage 27.

Also, a stepped hole portion 44G extending toward one side (upper side) in the axial direction from an inner peripheral side of the cylindrical projecting portion 44E to the reduced diameter portion 44C, the large-diameter portion 44A to the small diameter cylinder portion 44B and of which a valve seat 44F for a check valve 62 is formed on the way, a radial hole 44H extending in the radial direction of the stepped hole portion 44G, and a later-described feedback throttle 54 are provided on the valve member 44. The stepped hole portion 44G communicates with the inlet side flow passage 25 through an inner peripheral side of the cylindrical projecting portion 44E. The radial hole 44H communicates with a later-described back pressure chamber 47 through the feedback throttle 54. As a result, the stepped hole portion 44G and the radial hole 44H constitute the feedback flow passage 49. A later-described main valve throttle 53 is provided at the cylindrical projecting portion 44E of the valve member 44.

The main valve seat 46 is provided on one end side of the main valve chamber 42 (on the inlet side flow passage 25 side). That is, the main valve seat 46 is provided at an intersecting portion between the outlet side flow passage 27 and the communicating hole 26 in the housing 23, and configured as a tapered annular valve seat. The main valve seat 46 communicates or shuts off hydraulic fluid by the valve portion 44D of the main valve 43 that is separated from and seated on the valve seat.

The inlet side flow passage 25 is provided in the housing 23, and connected to a discharge side of the hydraulic pump 11. The inlet side flow passage 25 applies pressure to the main valve 43 in the direction (valve opening direction) away from the main valve seat 46 based upon the pressurized oil (hydraulic fluid) supplied from the hydraulic pump 11. In addition to that, the inlet side flow passage 25 introduces hydraulic fluid from the outside of the main valve chamber 42 (on the hydraulic pump 11 side) to the inside of the main valve chamber 42. The inlet side flow passage 25 is opposite the main valve seat 46.

The outlet side flow passage 27 is provided in the housing 23, and connected to the spool sliding bore 24 of the control valve for arm 18. The outlet side flow passage 27 introduces hydraulic fluid from the inside of the main valve chamber 42 (on the communicating hole 26 side) to the outside of the main valve chamber (on the spool sliding bore 24 side of the control valve for arm 18, more specifically on the arm cylinder 9 side) when the main valve 43 is separated from the main valve seat 46. In addition to that, the outlet side flow passage 27 applies pressure to the main valve 43 in the direction (valve opening direction) away from the main valve seat 46. The outlet side flow passage 27 is also opposite the main valve seat 46.

The back pressure chamber 47 is provided on the other end side of the main valve chamber 42 (opposite the inlet side flow passage 25). The back pressure chamber 47 applies pressure to the main valve 43 in the direction coming closer to the main valve seat 46 (valve closing direction). That is, the back pressure chamber 47 is a control pressure chamber variably controlling the displacement amount of the main valve 43 (lift amount), and is formed between the recessed portion 37 of the pilot housing 36 and the main valve 43. The back pressure chamber 47 normally communicates with the first passage 39 of the pilot housing 36.

The valve spring 48 is located in the back pressure chamber 47 and disposed between (the valve-holding member 45 of) the main valve 43 and (a bottom portion of) the recessed portion 37 of the pilot housing 36. The valve spring 48 is configured using a coil spring or the like, and normally urges the main valve 43 (valve-holding member 45) in the valve closing direction. The main valve 43 is also pressed in the valve closing direction by back pressure generated in the back pressure chamber 47 (control pressure).

The feedback flow passage 49 is provided inside the main valve 43. That is, the feedback flow passage 49 is configured by the stepped hole portion 44G and the radial hole 44H of the main valve 43 (valve member 44). In this case, the radial hole 44H communicates with the back pressure chamber 47 through the feedback throttle 54. As a result, the feedback flow passage 49 communicates the inlet side flow passage 25 with the back pressure chamber 47.

The pilot flow passage 50 is provided in the housing 23 and the pilot housing 36. That is, the pilot flow passage 50 is configured by the branch passage 35 of the housing 23, and the first passage 39 and the second passage 40 of the pilot housing 36. As a result, the pilot flow passage 50 communicates the back pressure chamber 47 with the outlet side flow passage 27. In this case, the first passage 39 constitutes a pilot throttle upstream line 51 as a line on an upstream side of a pilot throttle 56. The second passage 40 and the branch passage 35 constitute a pilot throttle downstream line 52 as a line on a downstream side of the pilot throttle 56.

The main valve throttle 53 is provided on a tip end side of the main valve 43 (more specifically, the valve member 44) (on the inlet side flow passage 25 side). As described later, the main valve throttle 53 is configured by a lateral hole 53A, a fixed throttle 53B, and a groove portion 53C. The main valve throttle 53 increases the opening amount between the inlet side flow passage 25 and the outlet side flow passage 27 according to the displacement in the direction away from the main valve seat 46 of the main valve 43 (the displacement toward an upper side in the vertical direction in FIGS. 2 to 4).

The feedback throttle 54 is provided between the feedback flow passage 49 and the back pressure chamber 47. The feedback throttle 54 is provided as a variable throttle on an outer peripheral surface side of the main valve 43 (the large-diameter portion 44A of the valve member 44). The feedback throttle 54 increases the opening amount between the feedback flow passage 49 and the back pressure chamber 47 according to the displacement in the direction away from the main valve seat 46 of the main valve (in the valve opening direction).

As shown in FIG. 2, the pilot valve 55 is slidably provided in the pilot housing 36. That is, the pilot valve 55 is provided slidably inserted (fitted) within the valve accommodating bore 38 of the pilot housing 36. The pilot valve 55 is configured as a spool valve body including the pilot throttle 56. The pilot valve 55 is displaced by introducing hydraulic fluid into the pilot chamber 57 and pressurizing the same. The hydraulic fluid inside a later-described drain chamber 59 is discharged by a drain port 59A according to the displacement of the pilot valve 55.

The pilot throttle 56 is provided in the pilot valve 55. That is, the pilot throttle 56 is provided as a variable throttle on an outer peripheral surface side of the pilot valve 55. The pilot throttle 56 decreases the opening amount of the pilot flow passage 50 according to the displacement of the pilot valve 55. That is, the pilot throttle 56 decreases the opening amount of the pilot flow passage 50 as the pilot valve 55 travels to one side in the axial direction (on the right side in the right-and-left direction in FIG. 2) according to pressurized oil (pilot pressure) supplied to the pilot chamber 57. In this case, the pilot throttle 56 is configured as a notch with constant depth. The pilot throttle may be configured as a notch that is deeper as it travels on one side in the axial direction (away from the pilot chamber 57), for example.

A lid member 58 is located on one side in the axial direction of the valve accommodating bore 38 and mounted so as to be threadedly engaged with the pilot housing 36. The lid member 58 closes one side of the valve accommodating bore 38 to define a drain chamber (spring chamber) 59 on one side of the pilot valve 55. A spring 60 is provided between the lid member 58 and the pilot valve 55 in a contracting state. The spring 60 urges the pilot valve 55 via a washer 61 in the valve opening direction.

The pilot valve 55, when it is disposed at a communication position (a) shown in FIG. 1 by the spring 60, communicates the first and second passages 39, 40 as the pilot flow passage 50 via the pilot throttle 56. At this time, the back pressure chamber 47 of the main valve 43 communicates with the outlet side flow passage 27 via the first and second passages 39, 40 and the branch passage 35 on the housing 23 side to maintain the pressure that is equal to that of the outlet side flow passage 27. As a result, the main valve 43 is opened to the full-open position.

Meanwhile, the pilot valve 55 is slidingly displaced against the spring 60 when the pilot pressure, as external instruction pressure supplied to the pilot chamber 57 via the supply/discharge port 41 from a remote operating valve for external instruction (not shown), rises up to a predetermined pressure value or more, to shut off the first and second passages 39, 40. As a result, the pilot valve 55 is switched against the spring 60 from the communication position (a) to the blockade position (b) shown in FIG. 1. At this time, the back pressure chamber 47 of the main valve 43 is communicated the second passage 40 (outlet side flow passage 27) with the minimum opening amount. As a result, the main valve 43 is opened at a minimum-open position.

The check valve 62 is provided in the feedback flow passage 49. That is, the check valve 62 is accommodated between the valve member 44 and the valve-holding member 45. The check valve 62 is slidably inserted within the holding cylinder portion 45B of the valve-holding member 45, and is urged by the spring 63 so as to normally be seated on the valve seat 44F of the valve member 44. That is, the spring 63 for the check valve urges the check valve 62 in the valve closing direction. The check valve 62 allows for flow of hydraulic fluid from the inlet side flow passage 25 to the back pressure chamber 47 to block (shut off) its opposite flow. That is, the check valve 62 is opened so as to be separated from the valve seat 44F against the spring 63 when the pressure from the cylindrical projecting portion 44E side of the valve member 44 acts on the inlet side flow passage 25. As a result, pressurized oil in the inlet side flow passage 25 is supplied to the back pressure chamber 47 via the stepped hole portion 44G and the radial hole 44H of the valve member 44 and the feedback throttle 54. As a result, the check valve 62 allows for circulation of pressurized oil from the inlet side flow passage 25 in the main valve 43 toward the back pressure chamber 47 to block an opposite flow. That is, the check valve 62 blocks circulation of an oil liquid in the back pressure chamber 47 toward the stepped hole portion 44G and the inlet side flow passage 25 via the radial hole 44H of the valve member 44 and the like.

The flow control valve 33 thus configured includes a function of controlling the flow rate and a function of load check. That is, the flow control valve 33 includes a function of controlling the flow rate variably controlling the flow rate from the inlet side flow passage 25 to the outlet side flow passage 27 (flow rate of pressurized oil circulating in the control valve for arm 18) by controlling the displacement amount (lift amount, or opening area) of the main valve 43 according to the opening amount of the pilot throttle 56. In addition to that, the flow control valve 33 includes a function of load check blocking a flow of hydraulic fluid (oil liquid) from the outlet side flow passage 27 to the inlet side flow passage 25 by the main valve 43 and the check valve 62 when the pressure of the inlet side flow passage 25 is lower than the pressure of the outlet side flow passage 27.

Subsequently, the main valve throttle 53 of the main valve 43 will be described. The main valve throttle 53 controls the flow rate of pressurized oil flowing from the inlet side flow passage 25 to the outlet side flow passage 27 through the communicating hole 26 (opening area of the communicating hole 26 to the outlet side flow passage 27) according to the displacement in the axial direction of the main valve 43 (displacement in the vertical direction in FIGS. 2 to 4). The main valve throttle 53 is configured by a plurality of (e.g., 8) lateral holes 53A, a plurality of (e.g., 4) fixed throttles 53B, and a plurality of (e.g., 8) groove portions 53C.

The lateral hole 53A is provided at the cylindrical projecting portion 44E of the main valve 43. The lateral hole 53A extends in the radial direction of the main valve 43 (in the direction perpendicular to the center axis of the main valve 43). That is, the lateral hole 53A is formed at the cylindrical projecting portion 44E as a through hole penetrating between an outer peripheral side and an inner peripheral side of the cylindrical projecting portion 44E. The fixed throttle 53B is located closer to the valve portion 44D side than the lateral hole 53A, and provided at the cylindrical projecting portion 44E of the main valve 43. The fixed throttle 53B extends in the radial direction of the main valve 43 (in the direction perpendicular to the center axis of the main valve 43), and is formed at the cylindrical projecting portion 44E as a throttle hole that is smaller than the lateral hole 53A. That is, the fixed throttle 53B also penetrates between the outer peripheral side and the inner peripheral side of the cylindrical projecting portion 44E, as well as the lateral hole 53A. The lateral hole 53A and the fixed throttle 53B communicate the inlet side flow passage 25 with the outlet side flow passage 27 through the inside of the main valve 43 (more specifically, the inside of the cylindrical projecting portion 44E).

The groove portion 53C is located closer to the opening side of the cylindrical projecting portion 44E than the lateral hole 53A, and provided on the outer peripheral side of the cylindrical projecting portion 44E. The groove portion 53C communicates the inlet side flow passage 25 with the outlet side flow passage 27 via an outer peripheral portion of the main valve 43 (on an outer peripheral side of the cylindrical projecting portion 44E). The groove portion 53C is formed as a communicating passage communicating with the lateral hole 53A in the axial direction of the main valve 43 between the housing 23 and the outer periphery of the main valve 43. That is, the groove portion 53C extends in the axial direction of the main valve 43 from the opening side of the cylindrical projecting portion 44E (parallel to the center axis of the main valve 43). The groove portion 53C starts on the opening side of the cylindrical projecting portion 44E and ends at the lateral hole 53A. The groove portion 53C communicates with the lateral hole 53A by projecting through a bottom surface 53C1 of the groove portion 53C. In this case, the groove portion 53C extends in the direction perpendicular to the center axis of the lateral hole 53A. That is, the groove portion 53C is disposed such that the hydraulic fluid spurting from the groove portion 53C changes the direction of a flow of the hydraulic fluid spurting from the lateral hole 53A. In this case, the direction of the hydraulic fluid spurting from the lateral hole 53A can be changed so as to approach the direction parallel to the center axis of the main valve 43 by the hydraulic fluid spurting from the groove portion 53C.

That is, as shown in FIG. 4, a hydraulic fluid F1 spurting from the groove portion 53C hits a hydraulic fluid F2 spurting from the lateral hole 53A. As a result, the hydraulic fluid F2 spurting from the lateral hole 53A, compared to a jet flow A in FIG. 8, can approach the direction parallel to the center axis of the main valve 43. As a result, fluid forces on the main valve in the valve opening direction can be reduced. In the embodiment, the same number of groove portions 53C and lateral holes 53A are provided. In this case, the groove portion 53C is the same as the lateral hole 53A in that they are located on the main valve 43 circumferentially. That is, the groove portion 53C and the lateral hole 53A have the same phase in that they are located on the main valve 43 circumferentially. In other words, a plurality of groove portions 53C is provided for a plurality of lateral holes 53A at equal intervals on the periphery of the main valve 43.

The control valve device 21 with the flow control valve according to the embodiment is configured as above, and subsequently its operation will be described.

First, the pressurized oil discharged from the hydraulic pump 11 circulates from the branch line 13A of the pump line 13 to the inlet side flow passage 25 of the housing 23, and between the main valve 43 of the flow control valve 33 and the communicating hole 26 (main valve throttle 53) to travel to the outlet side flow passage 27. The pressurized oil traveling to the outlet side flow passage 27 is supplied to and discharged from the arm cylinder 9 via a pair of actuator lines 19A, 19B by switching the control valve for arm 18 from a neutral position (A) to a switching position (B) or (C).

The flow rate of the pressurized oil supplied to the arm cylinder 9 is determined by the opening area at the main valve 43 of the flow control valve 33 and the opening area by the spool 29 (switching lands 29A, 29B) of the control valve for arm 18. The main valve 43 of the flow control valve 33 shuts off both passages 25, 27 by allowing the valve portion 44D to be seated on the main valve seat 46 of the housing 23 when the flow of the pressurized oil from the inlet side flow passage 25 of the housing 23 toward the outlet side flow passage 27 is blocked.

Herein, the supply of the pilot pressure to the pilot chamber 57 of the pilot valve 55 pressurizes the pilot chamber 57 to displace the pilot valve 55 in the right direction in FIG. 2 when the flow rate from the inlet side flow passage 25 to the outlet side flow passage 27 is variably controlled. As a result, the opening amount of the pilot throttle 56 of the pilot valve 55 is variably controlled. Then, a flow occurs from the inlet side flow passage 25 to the outlet side flow passage 27, for example, when the pressure of the inlet side flow passage 25 is higher than the outlet side flow passage 27. At this time, a flow occurs from the inlet side flow passage 25 to the check valve 62, the feedback throttle 54 to the back pressure chamber 47, and another flow occurs from the back pressure chamber 47 to the pilot throttle upstream line 51, the pilot throttle 56, the pilot throttle downstream line 52 to the outlet side flow passage 27.

Herein, since the opening amount of the feedback throttle 54 is large when the displacement amount in the valve opening direction of the main valve 43 is larger than the opening amount of the pilot throttle 56 as the opening amount between the back pressure chamber 47 and the outlet side flow passage 27, the pressure of the back pressure chamber 47 approaches the pressure of the inlet side flow passage 25. As a result, the main valve 43 is displaced in the valve closing direction from forces in the valve closing direction by the pressure of the back pressure chamber 47. The resulting decreases in the opening amount of the feedback throttle 54 according to the displacement of the main valve 43 reduce the pressure of the back pressure chamber 47 and forces in the valve closing direction by the pressure of the back pressure chamber 47 on the main valve 43.

As a result of the position feedback action, the main valve 43 stops at a position where "forces in the valve opening direction by the pressure of the inlet side flow passage 25 and the outlet side flow passage 27" and "forces in the valve closing direction of the pressure of the back pressure chamber 47 and the valve spring 48" are equal. As a result, the displacement amount of the main valve 43 is controlled such that the opening amount of the feedback throttle 54 corresponds to the opening amount of the pilot throttle 56 variably controlled. In accordance therewith, the flow rate from the inlet side flow passage 25 to the outlet side flow passage 27 can variably be controlled by controlling the opening amount of the main valve throttle 53. At this time, the main valve 43 is displaced at a position as shown in FIG. 4 such that the opening amount of the main valve throttle 53 is configured by the lateral hole 53A and the fixed throttle 53B.

Meanwhile, the pilot chamber 57 is pressurized to be the maximum pressure, the pilot valve 55 is displaced to be the maximum displacement amount, and the opening amount of the pilot throttle 56 is controlled to be the minimum when the flow rate from the inlet side flow passage 25 to the outlet side flow passage 27 is controlled to be the minimum. Herein, a flow occurs from the inlet side flow passage 25 to the outlet side flow passage 27, for example, when the pressure of the inlet side flow passage 25 is higher than that of the outlet side flow passage 27. At this time, a flow occurs from the inlet side flow passage 25 to the check valve 62, the feedback throttle 54 to the back pressure chamber 47, and another flow occurs from the back pressure chamber 47 to the pilot throttle upstream line 51, the pilot throttle 56, the pilot throttle downstream line 52 to the outlet side flow passage 27.

The displacement amount of the main valve 43 is controlled to the minimum so as to allow the opening amount of the feedback throttle 54 to correspond to the opening amount of the pilot throttle 56 by the above-described position feedback action. In accordance therewith, the flow rate from the inlet side flow passage 25 to the outlet side flow passage 27 can variably be controlled to be the minimum by controlling the minimum opening amount of the main valve throttle 53. At this time, the main valve is displaced from a position as shown in FIG. 3 in the valve-opening direction such that the opening amount of the main valve throttle 53 is configured only by the fixed throttle 53B.

Regarding the function of load check, a reverse flow from the outlet side flow passage 27 to the inlet side flow passage 25 can occur when the pressure of the inlet side flow passage 25 is lower than that of the outlet side flow passage 27. At this time, a flow occurs from the outlet side flow passage 27 to the pilot throttle downstream line 52, the pilot throttle 56, the pilot throttle upstream line 51, the back pressure chamber 47, the feedback throttle 54, the check valve 62 to the inlet side flow passage 25, but the flow is blocked by the check valve 62. As a result, since the pressures of the back pressure chamber 47 and the outlet side flow passage 27 are equal, the main valve 43 is displaced in the valve closing direction by forces on the main valve 43 in the valve closing direction by the pressure of the back pressure chamber 47. As a result, the valve portion 44D of the main valve 43 is seated on the main valve seat 46, and a flow from the outlet side flow passage 27 to the main valve throttle 53 to the inlet side flow passage 25 is blocked. As a result, a reverse flow from the outlet side flow passage 27 to the inlet side flow passage 25 can be prevented to achieve the function of load check.

Subsequently, the state of valve opening shown in FIG. 4, that is, the state of the main valve 43 with the maximum displacement and the main valve throttle 53 with the maximum opening amount will be described. There are 2 passages passing through the main valve throttle 53 regarding the state of valve opening shown in FIG. 4. One passage starts at the inlet side flow passage 25, passes through the inside of the main valve 43 (cylindrical projecting portion 44E), the lateral hole 53A or the fixed throttle 53B, and ends at the outlet side flow passage 27. The other passage starts at the inlet side flow passage 25, passes through the groove portion 53C of an outer peripheral side of the main valve 43 (cylindrical projecting portion 44E), and ends at the outlet side flow passage 27. The jet flow (hydraulic fluid F1) passing through the groove portion 53C hits the jet flow (hydraulic fluid F2) passing through the lateral hole 53A. At this time, the direction of the jet flow (hydraulic fluid F2) passing through the lateral hole 53A (and the fixed throttle 53B) is changed so as to approach the direction parallel to the center axis of the main valve 43 by the jet flow (hydraulic fluid F1) passing through the groove portion 53C.

Figure 6:
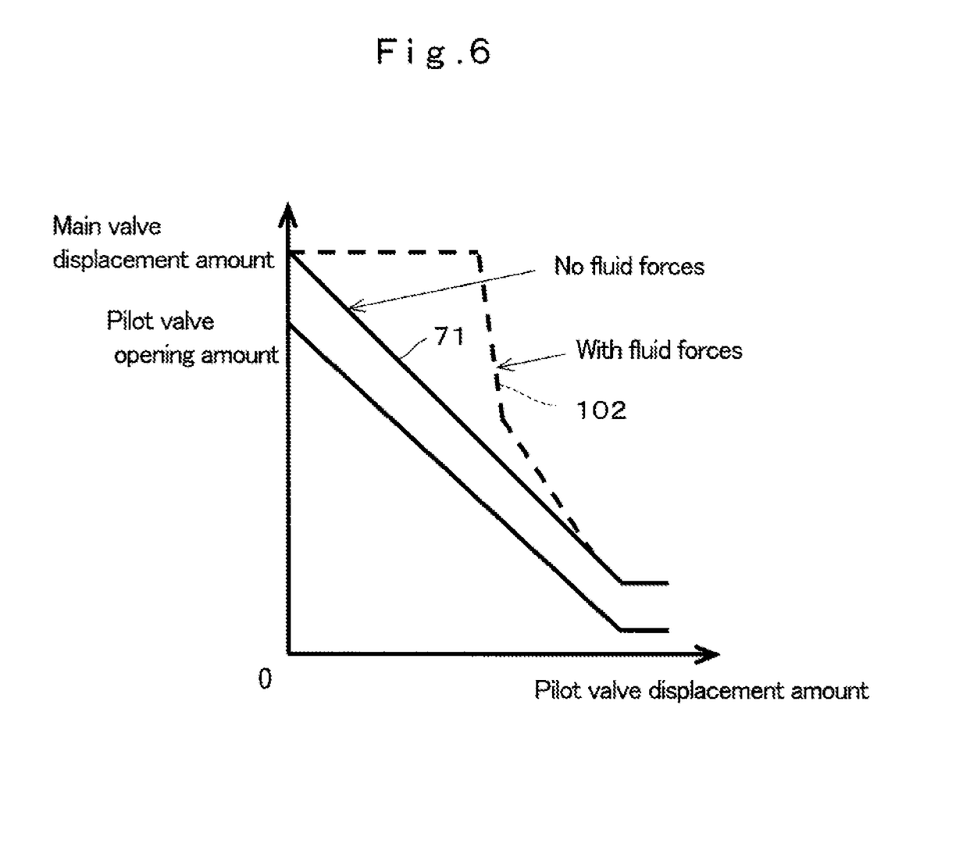
FIG. 6 is a characteristic diagram showing the relationship between the pilot valve displacement amount, the pilot valve opening amount and the main valve displacement amount.

Thus, the direction of the jet flow passing through the main valve throttle 53 can approach the direction parallel to the center axis of the main valve 43 while the lateral hole 53A is open. As a result, fluid forces on the main valve 43 in the valve opening direction can be reduced when the displacement of the main valve 43 is the maximum and the opening amount of the lateral hole 53A is the maximum. Herein, a characteristics line 71 in FIG. 6 shows the relationship between the "displacement amount of the pilot valve 55" and the "displacement amount of the main valve 43" according to the embodiment. A characteristics line 102 in FIG. 6 shows the relationship between the "displacement amount of the pilot valve" and the "displacement amount of the main valve 100" according to a Comparative Example shown in FIG. 8. As shown in FIG. 6, while the Comparative Example (represented by the characteristics line 102) shows a tendency of slow start of valve closure when the opening amount of pilot throttle 56 is made smaller such that the main valves 43, 100 are displaced in the valve closing direction, this phenomenon can be improved by the embodiment (represented by the characteristics line 71).

The direction of the jet flow passing through the groove portion 53C doesn't change because the opening of the groove portion 53C shows no change even if the main valve 43 starts displacement in the valve closing direction to make smaller the opening amount of the lateral hole 53A. Thus, the direction of the jet flow passing through the lateral hole 53A (and fixed throttle 53B) can approach the direction parallel to the center axis of the main valve 43. As a result, the degree of decreases in fluid forces in the valve opening direction can be reduced. That is, as shown in FIG. 6, while the Comparative Example (represented by the characteristics line 102) shows a tendency of rapid displacement on its way when the opening amount of pilot throttle 56 is made smaller such that the main valves 43, 100 are displaced in the valve closing direction, this phenomenon can be improved by the embodiment (represented by the characteristics line 71).

Further, the opening amount of the main valve throttle 53 is regulated by the "lateral hole 53A" and a "tubular opening formed of a housing 23". Meanwhile, fluid forces can be controlled by the "groove portion 53C" and an "opening in a cross-section in the direction perpendicular to the center axis relative to the main valve 43 formed of the housing 23". Thus, the opening amount of the main valve throttle 53 and fluid forces can independently be controlled, and the opening amount of the main valve throttle 53 and fluid forces can readily be controlled. In addition to this, it is not necessary to make larger the pressure receiving diameter of the main valve 43, and thus the valve can be made smaller. In addition, this can be achieved for conventional products merely by additionally processing the same.

According to the embodiment, the groove portion 53C is the same as the lateral hole 53A in that the main valve 43 is located circumferentially. That is, a plurality of groove portions 53C is provided for a plurality of lateral holes 53A at equal intervals on the periphery of the main valve 43. Thus, the jet flow passing through the groove portion 53C can directly hit the jet flow passing through the lateral hole 53A.

According to the above-described embodiment, one typical configuration of providing 8 lateral holes 53A and the same number of groove portions 53C is described. However, not limited to this, more or less than 8 lateral holes 53A and groove portions 53C may be provided. Lateral holes 53A and groove portions 53C may be provided in different numbers so long as a required opening amount and fluid force characteristics can be obtained. This is applied to the fixed throttle 53B as well.

According to the above-described embodiment, one typical configuration of providing groove portions 53C corresponding to a plurality of lateral holes 53A is described. However, not limited to this, like a modification shown in FIG. 7, for example, a small diameter section 81 as one groove portion for a plurality of lateral holes 53A may be provided. That is, in the modification shown in FIG. 7, the small diameter section 81, having a smaller outer diameter dimension than a part where the lateral hole 53A is provided, is provided on an outer peripheral surface on a tip end side of the main valve 43, more specifically, on a tip end side of the cylindrical projecting portion 44E.

Figure 7:
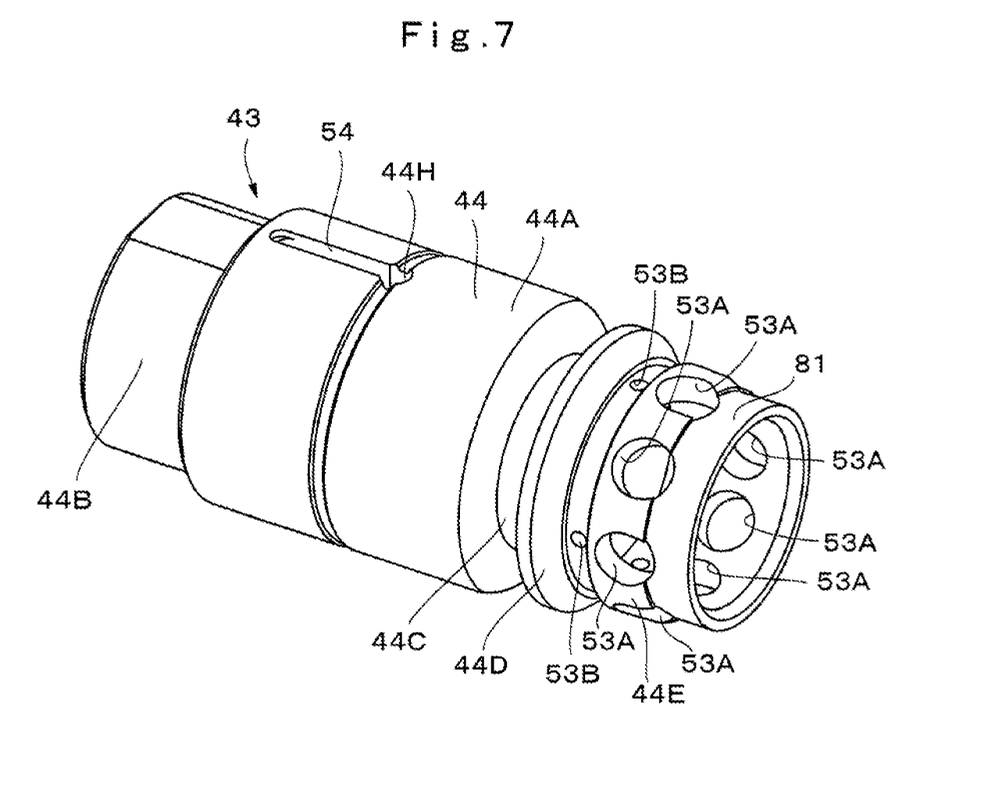
FIG. 7 is a perspective view showing a main valve according to a modification.

In such a modification, a groove portion is configured by the small diameter section 81 provided at a tip end of the main valve 43. Such a modification can also reduce fluid forces on the main valve 43 in the valve opening direction as in the embodiment because the jet flow passing through the small diameter section 81 as a groove portion hits the jet flow passing through the lateral hole 53A. Further, according to the modification, the groove portion (small diameter section 81) can readily be formed at the tip end of the main valve 43. That is, compared to the configuration of providing a plurality of groove portions, a work of forming groove portions can be saved.

In the above-described embodiment, one typical configuration of one (integrated or common) casing by the housing 23 and the pilot housing 36 is described. However, not limited to this, for example, a housing and a pilot housing may be located separately, and a connecting line may be provided between the housing and the pilot housing. In this case, a main valve chamber is provided in the housing. That is, the main valve chamber, like the above-described embodiment, can be configured to be provided both in a housing and a pilot housing, or in a housing. In other words, the main valve chamber is provided in at least a housing out of the housing and a pilot housing.

In the above-described embodiment, one typical configuration of the pilot throttle 56 of the pilot valve 55 to decrease the opening amount of the pilot flow passage 50 according to the displacement of the pilot valve 55 is described. However, not limited to this, for example, the pilot throttle of the pilot valve may be configured to increase the opening amount of the pilot flow passage according to the displacement of the pilot valve.

In the above-described embodiment, one example of a flow control valve 33 controlling the flow rate of pressurized oil supplied to and discharged from the control valve for arm 18 toward the arm cylinder 9 is described. However, not limited to this, for example, the flow control valve 33 may be applied to a flow control valve controlling the flow rate of pressurized oil supplied to and discharged from the control valve for boom 16 to the boom cylinder 8, and may be applied to a flow control valve where pressurized oil is supplied to and discharged and from a bucket cylinder or otherwise employed hydraulic actuators through a directional control valve.

In the above-described embodiment, one example of a hydraulic excavator 1 is described as a construction machine. However, not limited to this, the hydraulic excavator can widely be applied to wheel loaders, hydraulic cranes, bulldozers and other construction machines, for example. The flow control valve 33 may be configured to variably control the flow rate of hydraulic fluid from a small flow rate to a large flow rate, depending on the displacement amount (lift amount) of the main valve 43, and it can widely be applied as a flow control valve used with each type of industrial equipment and machine instruments. The embodiments and modifications are provided for illustration, and partial substitutions or combinations of configurations shown in the embodiments and modifications are obviously possible.

DESCRIPTION OF REFERENCE NUMERALS

1: Hydraulic excavator (Construction machine)
21: Control valve device
23: Housing
25: Inlet side flow passage
27: Outlet side flow passage
33: Flow control valve
36: Pilot housing
42: Main valve chamber
43: Main valve
44D: Valve portion
46: Main valve seat
47: Back pressure chamber
49: Feedback flow passage
50: Pilot flow passage
53: Main valve throttle
53A: Lateral hole
53C: Groove portion
54: Feedback throttle
55: Pilot valve
56: Pilot throttle
81: Small diameter section (Groove portion)

The invention claimed is:

1. A flow control valve comprising:
a housing;
a pilot housing;
a main valve chamber provided in the housing;
an inlet side flow passage that introduces hydraulic fluid from outside of the main valve chamber to inside of the main valve chamber;
a main valve slidably provided in the main valve chamber and having a valve portion and a cylindrical projecting portion projecting in an axial direction toward the inlet side flow passage from an outlet side of the valve portion;
a main valve seat provided on one end side of the main valve chamber and communicating or shutting off hydraulic fluid by allowing the valve portion of the main valve to be separated from and seated on the main valve seat;
an outlet side flow passage introducing hydraulic fluid from the inside of the main valve chamber to the outside of the main valve chamber when the main valve is separated from the main valve seat and providing pressure in a direction away from the main valve seat for the main valve;
a back pressure chamber formed between a recessed portion of the pilot housing and the main valve and providing pressure in the direction coming closer to the main valve seat for the main valve;
a feedback flow passage provided in the main valve and communicating the inlet side flow passage and the back pressure chamber;
a pilot flow passage provided in the housing and the pilot housing and communicating the back pressure chamber and the outlet side flow passage;
a main valve throttle provided in the main valve and increasing an opening amount between the inlet side flow passage and the outlet side flow passage as the main valve is displaced in the direction away from the main valve seat;
a feedback throttle provided between the feedback flow passage and the back pressure chamber and increasing the opening amount between the feedback flow passage and the back pressure chamber as the main valve is displaced in the direction away from the main valve seat;
a pilot valve slidably provided in the pilot housing; and
a pilot throttle provided in the pilot valve and decreasing or increasing the opening amount of the pilot flow passage as the pilot valve is displaced, wherein
in the flow control valve having a flow rate control function variably controlling a flow rate from the inlet side flow passage to the outlet side flow passage by controlling a displacement amount of the main valve, depending on the opening amount of the pilot throttle, characterized in that:
the main valve throttle is configured by a lateral hole, provided at the cylindrical projecting portion and communicating inside of the cylindrical projecting portion and outside of the cylindrical projecting portion, and a groove portion provided on an outer peripheral side of the cylindrical projecting portion, extending in the axial direction of the main valve from a position closer to the inlet side flow passage than a position penetrated by the lateral hole, communicating with the lateral hole by projecting through a bottom surface of the groove portion, and
there are two passages, including a first passage and a second passage, passing through the main valve throttle regarding a state of valve opening of the main valve,
the first passage starts at the inlet side flow passage, passes through the inside of the cylindrical projecting portion and the lateral hole, and ends at the outlet side flow passage, and
the second passage starts at the inlet side flow passage, passes through a communicating passage composed of the groove portion and the housing, and ends at the outlet side flow passage,
a jet flow passing through the communicating passage of the second passage hits a jet flow passing through the lateral hole of the first passage.

2. The flow control valve according to claim 1, wherein
a plurality of the groove portions is provided at equal intervals on a periphery of the main valve,
a plurality of the lateral holes is provided at equal intervals on the periphery of the main valve, and
the groove portions and the lateral holes are provided on the main valve circumferentially.

3. The flow control valve according to claim 1, wherein the groove portion is configured by a small diameter section provided at a tip end of the main valve.

* * * * *